(12) United States Patent
Dohse et al.

(10) Patent No.: US 10,704,412 B2
(45) Date of Patent: Jul. 7, 2020

(54) BELL CRANK AND BAR ASSEMBLY

(71) Applicant: UNITED TECHNOLOGIES CORPORATION, Farmington, CT (US)

(72) Inventors: Lauren Dohse, Rocky Hill, CT (US); Eric Weston Awtry, Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 67 days.

(21) Appl. No.: 16/153,054

(22) Filed: Oct. 5, 2018

(65) Prior Publication Data

US 2020/0109640 A1    Apr. 9, 2020

(51) Int. Cl.
*F01D 17/16*      (2006.01)
*F16H 21/44*      (2006.01)

(52) U.S. Cl.
CPC ........... *F01D 17/162* (2013.01); *F16H 21/44* (2013.01); *F05D 2230/60* (2013.01)

(58) Field of Classification Search
CPC ..... F01D 17/162; F16H 21/44; F05D 2230/60
See application file for complete search history.

(56) References Cited

U.S. PATENT DOCUMENTS

| 5,549,448 | A | 8/1996 | Langston |
| 5,692,879 | A * | 12/1997 | Charbonnel .......... F01D 17/162 |
| | | | 415/159 |
| 9,103,283 | B2 | 8/2015 | Leblanc et al. |
| 2013/0149023 | A1 | 6/2013 | Wiecko et al. |
| 2014/0010637 | A1 | 1/2014 | Pudvah et al. |

FOREIGN PATENT DOCUMENTS

| EP | 1101902 A2 | 5/2001 |
| EP | 1207271 A2 | 5/2002 |
| EP | 2949878 A1 | 12/2015 |

OTHER PUBLICATIONS

European Search Report for Application No. EP 19 20 0919.

* cited by examiner

*Primary Examiner* — Richard A Edgar
*Assistant Examiner* — Michael K. Reitz
(74) *Attorney, Agent, or Firm* — Cantor Colburn LLP

(57) ABSTRACT

An assembly for use with a gas turbine engine includes a block housing, a main bell crank, a bell crank, and a sync rod. The main bell crank extends between a main bell crank first end and a main bell crank second end that is connected to an actuator. The bell crank extends between a bell crank first end and a bell crank second end that is pivotally supported by the block housing. The sync rod is connected the main bell crank first end and the bell crank first end. The sync rod defines a first tab disposed proximate a first side and extends beyond a face of the sync rod.

19 Claims, 6 Drawing Sheets

BELL CRANK AND BAR ASSEMBLY

BACKGROUND

Exemplary embodiments of the present disclosure relates to gas turbine engines, and in particular to an assembly for positioning variable vanes of the gas turbine engine.

Gas turbine engines are provided with rotating and stationary components that affect the flow of air through the gas turbine engine. The stationary components may include vanes that are placed in an airflow to aid in directing the airflow towards rotating components such as blades. The angular position of the vanes may be varied to optimize airflow characteristics for various operating conditions, such vanes may be referred to as variable vanes. A mechanism may be provided to connect the variable vane to an actuation system. Assembly issues may impact the functionality or operation of the mechanism. Accordingly it is desirable to provide a mechanism that may be error-proofed for assembly.

BRIEF DESCRIPTION

Disclosed is an assembly for use with a gas turbine engine that includes a block housing, a main bell crank, a bell crank, and a sync rod. The block housing is arranged to be disposed on a case of the gas turbine engine. The main bell crank is pivotally supported by the block housing. The main bell crank extends between a main bell crank first end and a main bell crank second end that is connected to an actuator. The bell crank extends between a bell crank first end and a bell crank second end that is pivotally supported by the block housing. The sync rod is connected the main bell crank first end and the bell crank first end. The sync rod has a first side, a second side disposed opposite the first side, a first face and a second face disposed opposite the first face, each face extending between the first side and the second side. The sync rod defines a first tab disposed proximate the first side and extends beyond at least one of the first face and the second face.

In addition to one or more of the features described above, or as an alternative to any of the foregoing embodiments, the bell crank first end includes a bell crank first arm, a bell crank second arm, and a bell crank end wall extending between the bell crank first arm and the bell crank second arm.

In addition to one or more of the features described above, or as an alternative to any of the foregoing embodiments, the first face is disposed proximate the bell crank first arm, the second face is disposed proximate the bell crank second arm, and the second side faces towards the bell crank end wall.

In addition to one or more of the features described above, or as an alternative to any of the foregoing embodiments, the first tab is arranged to abut an end surface of at least one of the bell crank first arm and the bell crank second arm.

In addition to one or more of the features described above, or as an alternative to any of the foregoing embodiments, the end surface of at least one of the bell crank first arm and the bell crank second arm is disposed opposite the bell crank end wall.

In addition to one or more of the features described above, or as an alternative to any of the foregoing embodiments, the end surface of at least one of the bell crank first arm and the bell crank second arm defines a perturbation.

In addition to one or more of the features described above, or as an alternative to any of the foregoing embodiments, the perturbation is disposed opposite the first tab.

In addition to one or more of the features described above, or as an alternative to any of the foregoing embodiments, the sync rod defines a mounting hole that extends from the first face towards the second face.

In addition to one or more of the features described above, or as an alternative to any of the foregoing embodiments, at least one of the bell crank first arm and the bell crank second arm defines an opening.

In addition to one or more of the features described above, or as an alternative to any of the foregoing embodiments, engagement between the perturbation and the first tab inhibits the mounting hole from being disposed coaxial with the opening.

Also disclosed is a method of assembling a bell crank and bar assembly. The method includes pivotally connecting a bell crank having a bell crank first arm and a bell crank second arm to a block housing. An end surface of the bell crank second arm defines a perturbation. The method further includes disposing a sync rod between the bell crank first arm and the bell crank second arm. The sync rod has a first side, a second side, a first face and a second face disposed opposite the first face, each face extending between the first side and the second side. The sync rod defines a first tab that is disposed proximate the first side.

In addition to one or more of the features described above, or as an alternative to any of the foregoing embodiments, responsive to the first tab engaging the perturbation, inhibiting the sync rod from being disposed between the bell crank first arm and the bell crank second arm.

In addition to one or more of the features described above, or as an alternative to any of the foregoing embodiments, the first tab extends beyond the first face in a direction that extends from the second face towards the first face.

In addition to one or more of the features described above, or as an alternative to any of the foregoing embodiments, responsive to the first tab engaging an end surface of the bell crank first arm, arranging the sync rod to be disposed between the bell crank first arm and the bell crank second arm.

Further disclosed is a gas turbine engine that includes a case and a bell crank and bar assembly. The case is disposed about a central longitudinal axis of the gas turbine engine. The bell crank and bar assembly includes a block housing, a main bell crank, a bell crank, and a sync rod. The block housing is arranged to be disposed on a case of the gas turbine engine. The main bell crank is arranged to be pivotally supported by the block housing. The main bell crank has a main bell crank first arm and a main bell crank second arm spaced apart from the main bell crank first arm. The bell crank is arranged to be pivotally supported by the block housing. The bell crank has a bell crank first arm and a bell crank second arm spaced apart from the bell crank first arm. The sync rod is arranged to be disposed between the main bell crank first arm and the main bell crank second arm and disposed between the bell crank first arm and the bell crank second arm. The sync rod defines a first tab arranged to engage an end surface of at least one of the main bell crank second arm and the bell crank first arm.

In addition to one or more of the features described above, or as an alternative to any of the foregoing embodiments, the end surface of main bell crank second arm defines a perturbation.

In addition to one or more of the features described above, or as an alternative to any of the foregoing embodiments, engagement between the first tab and the perturbation inhibits the sync rod from being disposed between the main bell crank first arm and the main bell crank second arm.

In addition to one or more of the features described above, or as an alternative to any of the foregoing embodiments, the end surface of the bell crank first arm defines a perturbation.

In addition to one or more of the features described above, or as an alternative to any of the foregoing embodiments, engagement between the first tab and the perturbation inhibits the sync rod from being disposed between the bell crank first arm and the bell crank second arm.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
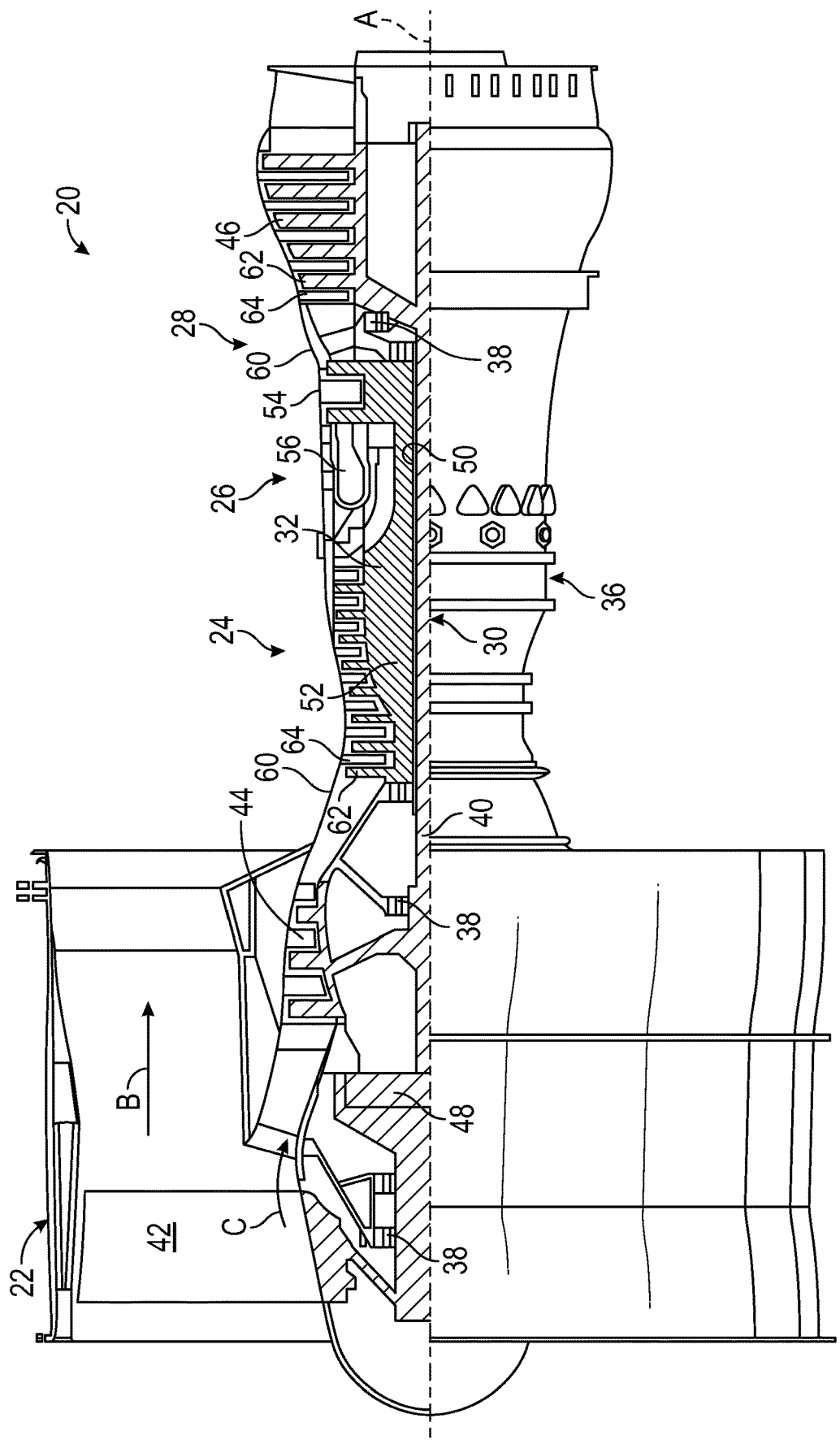
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^5$. The "Low corrected fan tip speed" as disclosed herein according to one non-limiting embodiment is less than about 1150 ft/second (350.5 m/sec).

At least one of the compressor section 24 and the turbine section 28 is provided with a case 60 that is disposed about components of each section. At least one of the compressor section 24 and the turbine section 28 may include alternating rows of a rotating blades 62 and vanes 64. At least one vane of the vanes 64 may be arranged as a variable vane that may pivot or rotate about a radial axis that is disposed generally transverse to the central longitudinal axis A of the gas turbine engine 20.

Figure 2:
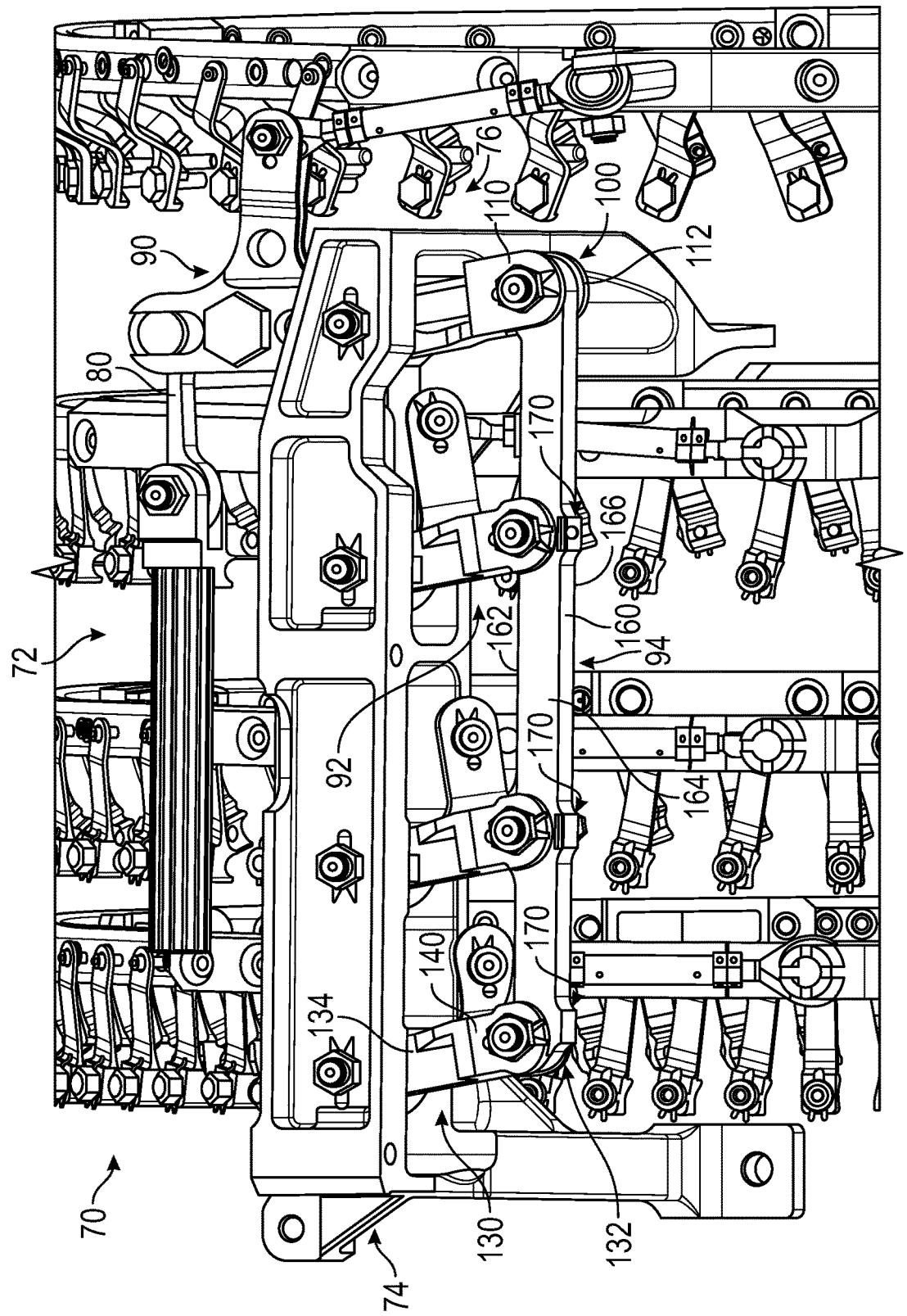
FIG. 2 is a partial view of a bell crank and bar assembly of the gas turbine engine.
Figure 3:
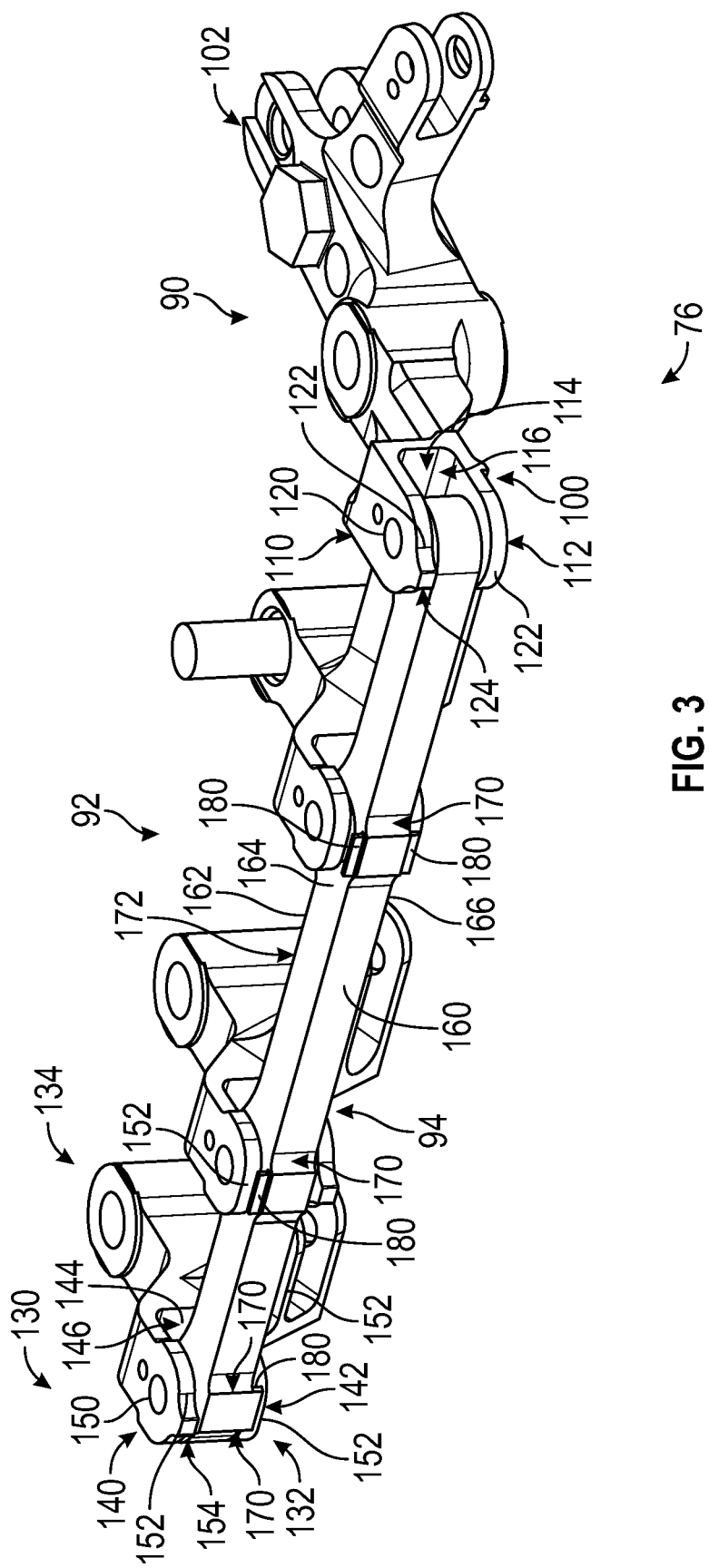
FIG. 3 is a perspective view of the bell crank and bar assembly.

Referring to FIGS. 2 and 3, a variable vane of the vanes 64 may be pivoted or actuated by an assembly 70 that is disposed on the case 60. The assembly 70 includes a block housing 74, and a bell crank and bar assembly 76 that is connected to a variable vane.

A linear actuator having an actuator piston 72 connected to a link 80 that is operatively connected to the bell crank and bar assembly 76. The actuator piston 72 is arranged to provide a force along an axis that is disposed transverse to the central longitudinal axis A to the bell crank and bar assembly 76 to pivot the vane 64 about the radial axis.

The block housing 74 is disposed on an outer surface of the case 60. The block housing 74 is arranged as an open housing through which components of the bell crank and bar assembly 76 extend. The bell crank and bar assembly 76 includes a main bell crank 90, a plurality of bell cranks 92 that are connected to the block housing 74 and the main bell crank 90, and a sync rod 94 is connected to the main bell crank 90 and the plurality of bell cranks 92.

The main bell crank 90 is pivotally supported by the block housing 74. The main bell crank 90 includes or extends between a main bell crank first end 100 and a main bell crank second end 102. The main bell crank first end 100 extends away from the actuator piston 72 and is connected to the sync rod 94. The main bell crank first end 100 includes a main bell crank first arm 110, a main bell crank second arm 112, and a main bell crank end wall 114 that extends between the main bell crank first arm 110 and the main bell crank second arm 112. A main bell crank receiving area 116 is defined between the main bell crank first arm 110, the main bell crank second arm 112, and the main bell crank end wall 114. The sync rod 94 is arranged to be at least partially received within the main bell crank receiving area 116. The main bell crank second end 102 is connected to the link 80 that is connected to the actuator piston 72.

A main bell crank opening 120 extends through the main bell crank first arm 110 and the main bell crank second arm 112. The main bell crank opening 120 is arranged to receive a fastener that extends through the main bell crank first arm 110, the sync rod 94, and the main bell crank second arm 112 to couple the sync rod 94 to the main bell crank first end 100.

An end surface 122 of at least one of the main bell crank first arm 110 and the main bell crank second arm 112 that is disposed opposite and parallel to the main bell crank end wall 114 defines a perturbation 124. The perturbation 124 may be arranged as a tab, a protrusion, a nub, an extension, or the like, that extends from the end surface 122 in a direction that extends from the main bell crank second end 102 towards the main bell crank first end 100.

Figure 5:
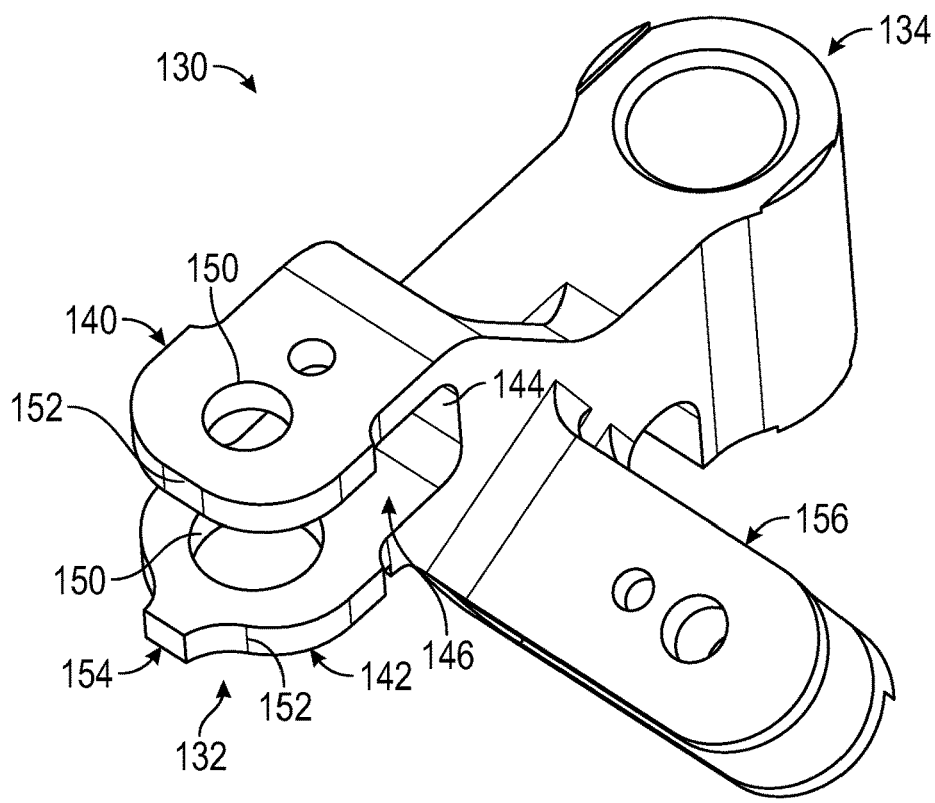
FIG. 5 is a perspective view of a bell crank.

Referring to FIGS. 2, 3, and 5, the plurality of bell cranks 92 are pivotally supported by the block housing 74 and are spaced apart from the main bell crank 90. At least one bell crank 130 of the plurality of bell cranks 92 includes or extends between a bell crank first end 132 and a bell crank second end 134 that is pivotally supported by the block housing 74.

The bell crank first end 132 includes a bell crank first arm 140, a bell crank second arm 142 that is spaced apart from the bell crank first arm 140, and a bell crank end wall 144 that extends between the bell crank first arm 140 and the bell crank second arm 142. A bell crank receiving area 146 is defined between the bell crank first arm 140, the bell crank second arm 142, and the bell crank end wall 144. The sync rod and 94 is arranged to be at least partially received within the bell crank receiving area 146.

A bell crank opening 150 extends through the bell crank first arm 140 and the bell crank second arm 142. The bell crank opening 150 is arranged to receive a fastener that extends through the bell crank first arm 140, the sync rod 94, and the bell crank second arm 142 to couple the sync rod 94 to the bell crank 130.

An end surface 152 of at least one of the bell crank first arm 140 and the bell crank second arm 142 defines a perturbation 154. The perturbation 154 may be arranged as a tab, a protrusion, a nub, an extension, or the like, that extends from the end surface 152 in a direction that extends from bell crank second end 134 towards the bell crank first end 132. The end surface 152 is disposed opposite and is disposed generally parallel to the bell crank end wall 144.

A bell crank ground arm 156 extends from the bell crank 130. The bell crank ground arm 156 extends in a direction that is generally perpendicular to the direction in which the bell crank first arm 140 and the bell crank second arm 142 extend.

Figure 4:
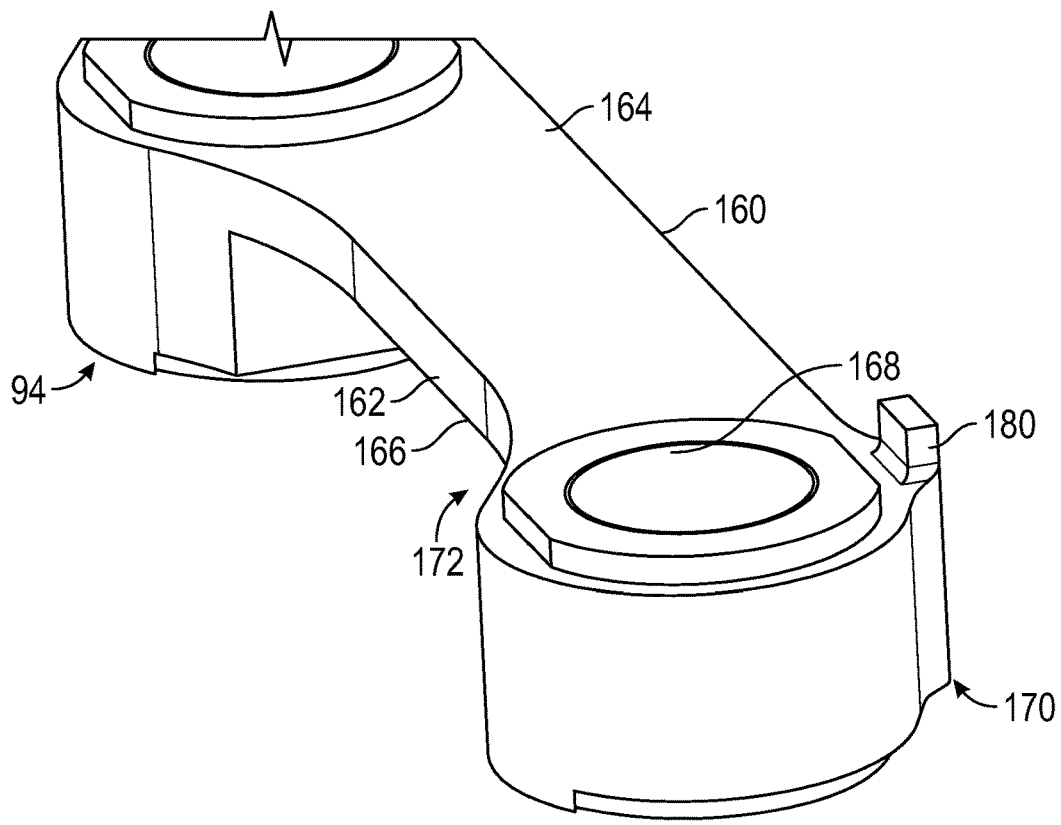
FIG. 4 is a perspective view of a bar assembly.

Referring to FIGS. 2-4, the sync rod 94 is connected to the main bell crank first end 100 and the bell crank first end 132. The sync rod 94 is arranged to be received within the main bell crank receiving area 116 such that the sync rod 94 is disposed between the main bell crank first arm 110 and the main bell crank second arm 112. The sync rod 94 is arranged to be received within the bell crank receiving area 146 such that the sync rod 94 is disposed between the bell crank first arm 140 and the bell crank second arm 142. The sync rod 94 is arranged to move the plurality of bell cranks 92 substantially synchronously with the movement of the main bell crank 90 responsive to actuation or movement of the actuator piston 72 to move the vane 64.

The sync rod 94 extends along an axis that is disposed generally parallel to the axis along which the actuator piston 72 extends. The sync rod 94 includes a first side 160, a second side 162, a first face 164, and a second face 166. The second side 162 is disposed opposite the first side 160. The second side 162 is arranged to face towards the bell crank end wall 144 and the main bell crank end wall 114. The first face 164 extends between first ends of the first side 160 and the second side 162. The first face 164 is arranged to be disposed proximate the bell crank first arm 140 and the main bell crank first arm 110. The second face 166 is disposed opposite the first face 164 and extends between second ends of the first side 160 and the second side 162. The second face 166 is arranged to be disposed proximate the bell crank second arm 142 and the main bell crank second arm 112.

The sync rod 94 defines mounting holes 168 that extend from the first face 164 towards the second face 166. The mounting holes 168 are disposed proximate mating regions or mating arrangements that are arranged to be received between the arms of bell cranks.

The first side 160 of the sync rod 94 defines a raised region 170 that extends away from the first side 160 in a direction that extends from the second side 162 towards the first side 160. The raised region 170 is generally aligned with the mounting hole 168. In the embodiment shown, the raised region 170 is axially aligned with the mounting hole 168 relative to the central longitudinal axis A and a plurality of raised regions 170 are provided.

The second side 162 of the sync rod 94 defines a recess or recessed region 172 that extends from the second side 162 towards the first side 160. The recess or recessed region 172 is disposed between adjacent mounting holes 168 or adjacent raised regions 170, as shown in FIG. 4.

The sync rod 94 defines at least one tab or a plurality of tabs 180. Tab 180 is disposed proximate the first side of the sync rod 94 and extends beyond at least one of the first face 164 and/or the second face 166. The tab 180 extends from the raised region 170 and is disposed perpendicular to and is spaced apart from the first face 164 of the sync rod 94. The size or height of the tab 180 may be limited to prevent clashing of the tab 180 with arms of a bell crank of the plurality of bell cranks 92 or arms of the main bell crank 90 even when properly installed. The tab or the plurality of tabs 180 extend beyond the nominal thickness of the sync rod 94.

The tab 180 is arranged to engage or abut an end surface 152 of the bell crank first arm 140 or the bell crank second arm 142 of the bell crank 130 and/or an end surface 122 of the main bell crank first arm 110 or the main bell crank second arm 112 of the main bell crank 90. The engagement or abutment of the tab 180 with the end surface 152 of the bell crank 130 and/or the end surface 122 of the main bell crank 90 ensures that the sync rod 94 is properly aligned with the main bell crank 90 and the plurality of bell cranks 92 such that the sync rod 94 may be properly installed.

The engagement or abutment of a first tab of the plurality of tabs 180 of the sync rod 94 with the end surface 152 of the bell crank 130 enables the mounting hole 168 of the sync rod 94 to be disposed coaxial with the bell crank opening 150 of the bell crank 130 such that the fastener may extend through the mounting hole 168 and the bell crank opening 150 to couple the sync rod 94 to the bell crank 130. The engagement or abutment of a second tab that is spaced apart from the first tab of the plurality of tabs 180 of the sync rod 94 with the end surface 122 of the main bell crank 90 enables the mounting hole 168 of the sync rod 94 to be disposed coaxial with the main bell crank opening 120 such that a fastener may extend through the mounting hole 168 and the main bell crank opening 120 to couple the sync rod 94 to the main bell crank 90.

The arrangement of the tab or plurality of tabs 180 of the sync rod 94 and the perturbations 124, 154 of the main bell crank 90 and the bell crank 130 facilitates mistake proofing of the sync rod 94 to inhibit the sync rod 94 from being assembled incorrectly such as upside down, flipped, or placing/aligning the mounting hole 168 with the incorrect opening of a bell crank of the plurality of bell cranks 92. For a given mating arrangement between the sync rod 94 and a bell crank, the tab 180 should be disposed opposite the perturbation 124, 154 to facilitate mating, such as the tab 180 being disposed proximate a first arm of a bell crank while the perturbation 124, 154 is disposed proximate or extends from a second arm of the bell crank, or vice versa. Should the tab 180 clash or engage with the perturbation 124, 154, the sync rod 94 may be inhibited from being installed with the main bell crank 90 and/or a bell crank of the plurality of bell cranks 92.

Figure 6:
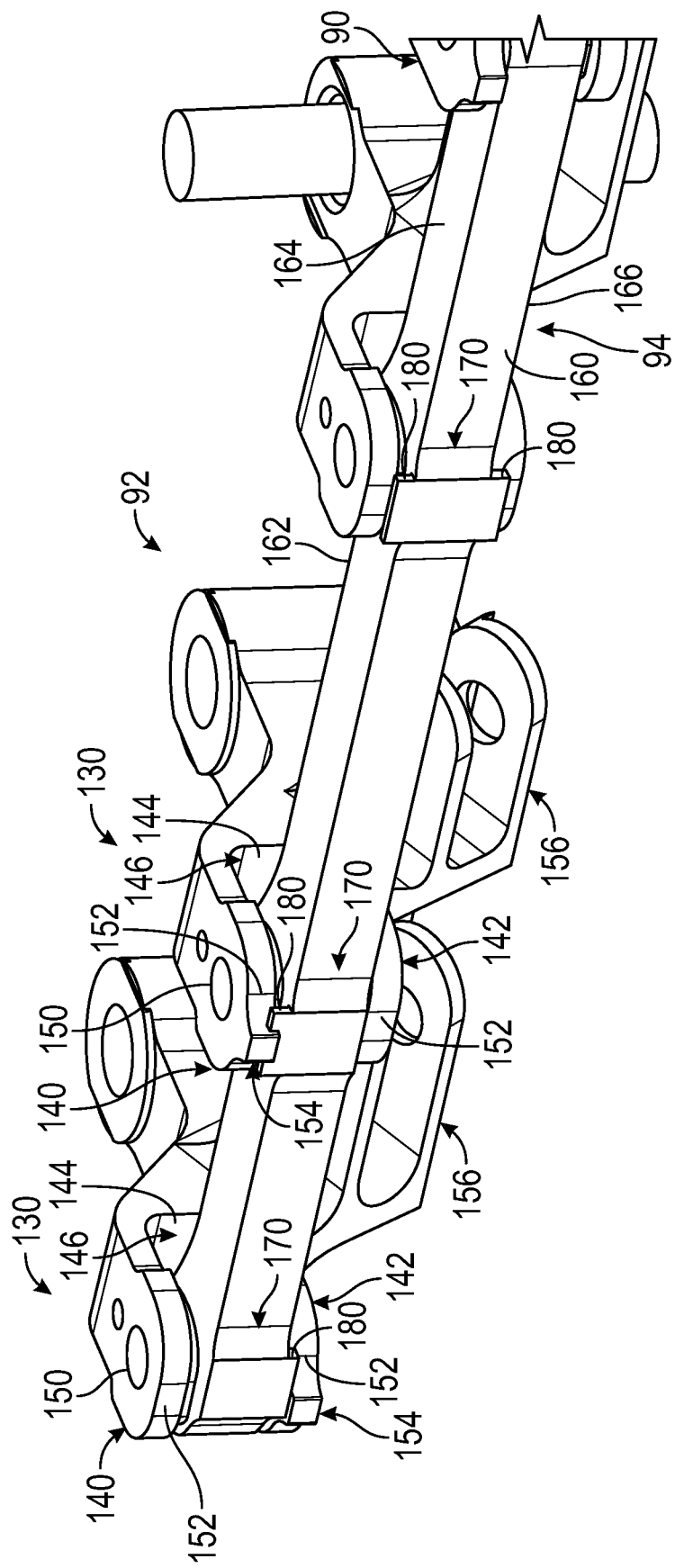
FIG. 6 is a perspective view of the bell crank and bar assembly in a blocking/interference condition.

Referring to FIG. 6, should the sync rod 94 be misaligned longitudinally, the at least one tab 180 may engage a perturbation 154 the bell crank 130. The engagement of the at least one tab 180 with a perturbation 154 of the bell crank 130 of the plurality of bell cranks 92 may inhibit the mounting hole 168 of the sync rod 94 from being disposed coaxial with the bell crank opening 150 of the bell crank 130 of the plurality of bell cranks 92.

Figure 7:
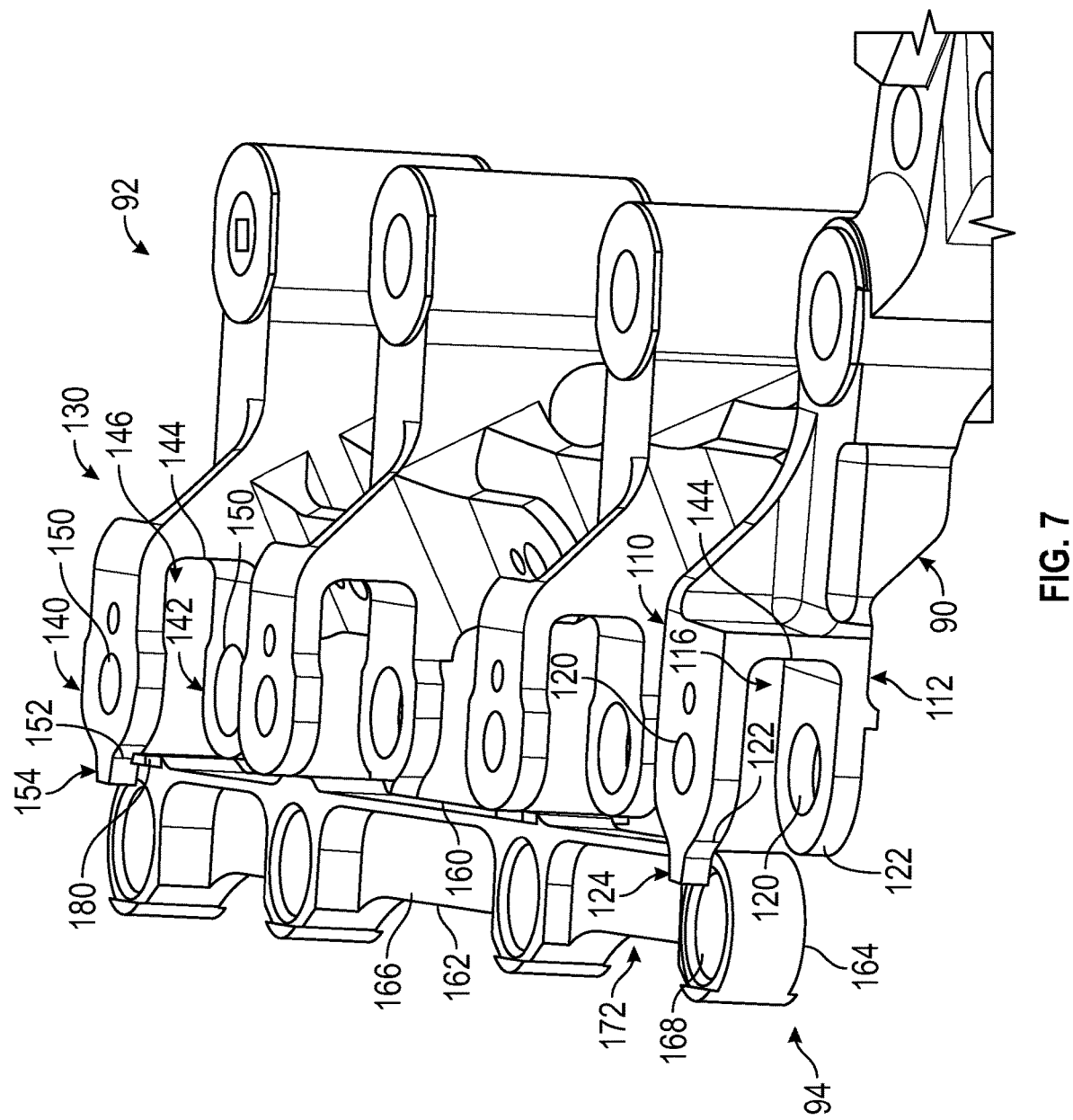
FIG. 7 is a perspective view of the bell crank and bar assembly in another blocking/interference condition.

Referring to FIG. 7, should the sync rod 94 be attempted to be installed in a flipped or reversed position, the at least one tab 180 may engage with a perturbation 154 of the bell crank 130. The engagement of at least one tab 180 with a perturbation 154 of the bell crank 130 of the plurality of bell cranks 92 inhibits the sync rod 94 from being received within the bell crank receiving area 146 or being disposed between the bell crank first arm 140 and the bell crank second arm 142. The engagement of at least one tab 180 with a perturbation 124 of the main bell crank 90 inhibits the sync rod 94 from being received within the main bell crank receiving area 116 or being disposed between the main bell crank first arm 110 and the main bell crank second arm 112.

Any combination of the mistake proofing features (e.g. the tab 180 and the perturbations 124, 154) aids in preventing the incorrect installation of the sync rod 94 with the bell cranks to inhibit impacting the performance of the assembly 70.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An assembly for use with a gas turbine engine, comprising:
    a block housing arranged to be disposed on a case of the gas turbine engine;
    a main bell crank pivotally supported by the block housing, the main bell crank extending between a main bell crank first end and a main bell crank second end that is connected to an actuator;
    a bell crank extending between a bell crank first end and a bell crank second end that is pivotally supported by the block housing; and
    a sync rod connected the main bell crank first end and the bell crank first end, the sync rod having a first side, a second side disposed opposite the first side, a first face and a second face disposed opposite the first face, each face extending between the first side and the second side, the sync rod defining a first tab disposed proximate the first side and extending beyond at least one of the first face and the second face.

2. The assembly of claim 1, wherein the bell crank first end includes a bell crank first arm, a bell crank second arm, and a bell crank end wall extending between the bell crank first arm and the bell crank second arm.

3. The assembly of claim 2, wherein the first face is disposed proximate the bell crank first arm, the second face is disposed proximate the bell crank second arm, and the second side faces towards the bell crank end wall.

4. The assembly of claim 2, wherein the first tab is arranged to abut an end surface of at least one of the bell crank first arm and the bell crank second arm.

5. The assembly of claim 4, wherein the end surface of at least one of the bell crank first arm and the bell crank second arm is disposed opposite the bell crank end wall.

6. The assembly of claim 4, wherein the end surface of at least one of the bell crank first arm and the bell crank second arm defines a perturbation.

7. The assembly of claim 6, wherein the perturbation is disposed opposite the first tab.

8. The assembly of claim 6, wherein the sync rod defines a mounting hole that extends from the first face towards the second face.

9. The assembly of claim 8, wherein at least one of the bell crank first arm and the bell crank second arm defines an opening.

10. The assembly of claim 9, wherein engagement between the perturbation and the first tab inhibits the mounting hole from being disposed coaxial with the opening.

11. A method of assembling a bell crank and bar assembly, comprising:
pivotally connecting a bell crank having a bell crank first arm and a bell crank second arm to a block housing, an end surface of the bell crank second arm defines a perturbation; and
disposing a sync rod between the bell crank first arm and the bell crank second arm, the sync rod having a first side, a second side, a first face and a second face disposed opposite the first face, each face extending between the first side and the second side, the sync rod defining a first tab that is disposed proximate the first side.

12. The method of claim 11, wherein responsive to the first tab engaging the perturbation, inhibiting the sync rod from being disposed between the bell crank first arm and the bell crank second arm.

13. The method of claim 12, wherein the first tab extends beyond the first face in a direction that extends from the second face towards the first face.

14. The method of claim 11, wherein responsive to the first tab engaging an end surface of the bell crank first arm, arranging the sync rod to be disposed between the bell crank first arm and the bell crank second arm.

15. A gas turbine engine, comprising:
a case disposed about a central longitudinal axis of the gas turbine engine; and
a bell crank and bar assembly, comprising:
a block housing arranged to be disposed on a case of the gas turbine engine,
a main bell crank arranged to be pivotally supported by the block housing, the main bell crank having a main bell crank first arm and a main bell crank second arm spaced apart from the main bell crank first arm,
a bell crank arranged to be pivotally supported by the block housing, the bell crank having a bell crank first arm and a bell crank second arm spaced apart from the bell crank first arm, and
a sync rod arranged to be disposed between the main bell crank first arm and the main bell crank second arm and disposed between the bell crank first arm and the bell crank second arm, the sync rod defining a first tab arranged to engage an end surface of at least one of the main bell crank second arm and the bell crank first arm.

16. The gas turbine engine of claim 15, wherein the end surface of the main bell crank second arm defines a perturbation.

17. The gas turbine engine of claim 16, wherein engagement between the first tab and the perturbation inhibits the sync rod from being disposed between the main bell crank first arm and the main bell crank second arm.

18. The gas turbine engine of claim 15, wherein the end surface of the bell crank first arm defines a perturbation.

19. The gas turbine engine of claim 18, wherein engagement between the first tab and the perturbation inhibits the sync rod from being disposed between the bell crank first arm and the bell crank second arm.

* * * * *